Oct. 16, 1951
L. MESSANT
2,571,155
PIANO ACTION
Filed March 22, 1949
2 Sheets-Sheet 1
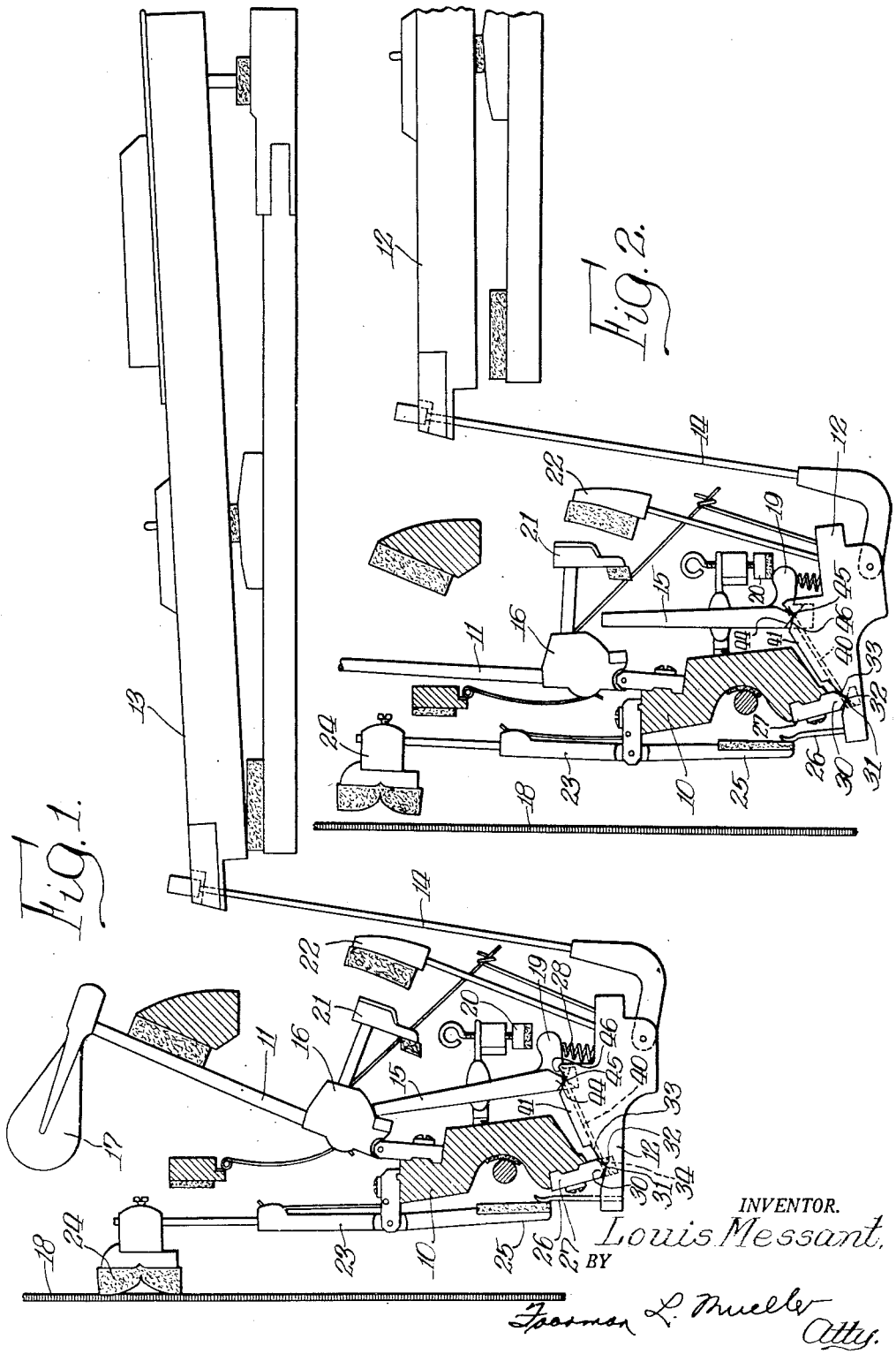
INVENTOR.
Louis Messant

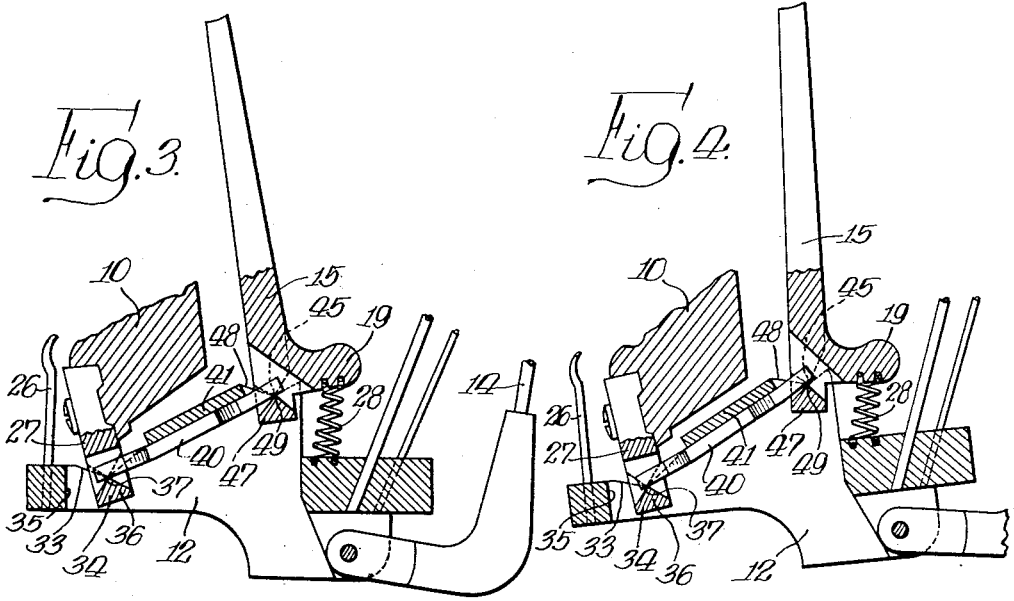
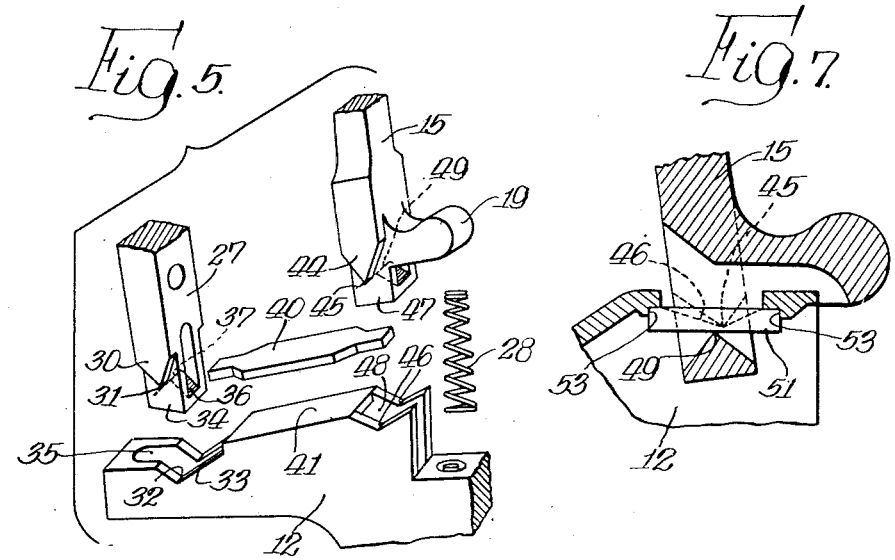
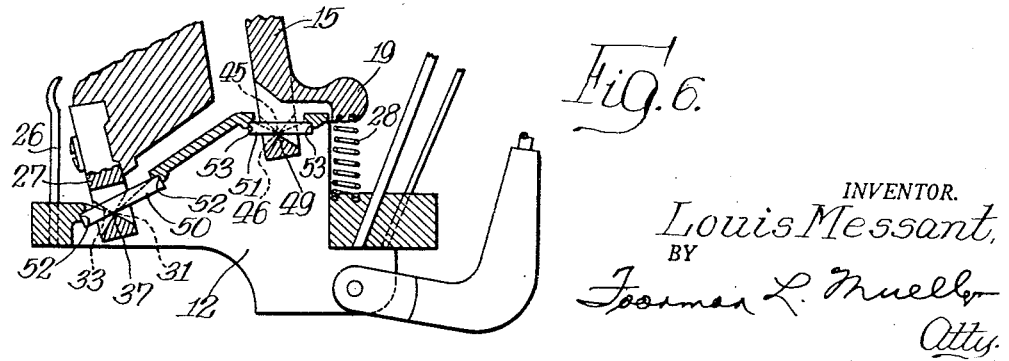

Patented Oct. 16, 1951

2,571,155

UNITED STATES PATENT OFFICE 2,571,155

PIANO ACTION

Louis Messant, Raubaix, France, assignor to Pratt, Read and Company, Inc., Ivoryton, Conn., a corporation of Connecticut Application March 22, 1949, Serial No. 82,757

17 Claims. (Cl. 84—240)

This invention relates generally to piano actions and more particularly to an improved pivotal connection for joining the various members of a piano action.

In the design of piano actions, it is necessary to provide a plurality of relatively movable members which are arranged so that very fast and smooth operation can be provided. Further, it is desired that the moving parts be so constructed that no noise is produced by operation thereof. In the prior art, piano actions have been made largely of wood with the surfaces which contact each other being covered by felt or other resilient material which eliminates any noise. The various elements of the action have been connected together by pivots formed by metal pins which fit in felt bushings. Springs are required in some instances to restore the members to their normal position after having been operated. These actions have been objectionable in that the construction is inherently expensive and great care must be exercised in the adjustment thereof. The operation of such actions is greatly affected by moisture, and is not as fast as is desired.

It is an object of the present invention to provide an improved piano action in which the members are pivotally mounted for exceedingly fast operation.

A further object is to provide a piano action which is adaptable for construction from plastic materials and which is not subject to changing characteristics due to different humidity conditions.

A still further object of this invention is to provide a piano action constructed of light weight plastic members of such construction that silent easy operation is provided thereby.

A feature of this invention is the provision of a piano action in which members are pivotally joined by knife edge connections so that movement therebetween may be provided with very little friction and the action therefore operates rapidly and works very easily.

Another feature of this invention is the provision of an action in which the members are of such construction that they can be easily molded of plastic material, and in which the various members are held together by springs to permit easy assembly and disassembly thereof and to also compensate for wear of the members of the action.

A further feature of this invention is the provision of a piano action in which members are held together by springs which also act to hold members in a desired position and thereby eliminate auxiliary springs normally used.

Further objects, features and advantages will be apparent from a consideration of the following description taken in connection with the accompanying drawings in which:

Fig. 1 shows a piano action in accordance with the invention in the normal position;

Fig. 2 is a fragmentary view showing the action in the operated position;

Fig. 3 is a sectional view showing the construction of a portion of the action as in Fig. 1;

Fig. 4 is a sectional view of the structure of Fig. 3 in the operated position;

Fig. 5 is an exploded perspective view illustrating the unique configuration of parts of the action;

Fig. 6 illustrates a modified action in accordance with the invention; and

Fig. 7 illustrates a further modification.

In practicing the invention there is provided a piano action in which the various members of the action such as the wippen, fly jack and mounting flanges are made of plastic material. These various members are pivoted together for normal piano operation by joints formed by a sharp edge on one member and a V-groove in the associated member. Such pivotally connected members are held together by a spring element which causes the edge to bear against the valley of the groove. The spring connection may be provided by shaping one of the members so that it may extend through an opening in the other member with the spring being interposed between interlocking portions of the members. The engagement between the members and the spring may be arranged so that the spring imparts a particular position to the members so that the usual springs required to hold the members in such particular positions are thereby eliminated.

Referring now to Fig. 1, there is illustrated a piano action including a rail structure 10 to which is pivotally connected a hammer 11 and a wippen 12. The wippen 12 is connected to a piano key 13 through abstract 14. A fly jack 15 is pivotally supported on the wippen 12 and engages the butt 16 of the hammer when the key is depressed to cause the head 17 of the hammer to strike a string such as 18. The jack 15 has a butt 19 adapted to engage let-off 20 for releasing the jack from the hammer when the wippen has moved through a certain angle. Secured to the hammer butt 16 is a projection 21 adapted to engage the back-check 22 to check the movement of the hammer in a well known manner. A damper 23 having a head 24 normally engaging the string is also pivoted to the rail 10 and has a portion 25 engaged by spoon 26 secured to the wippen 12 for releasing the damper when the action is operated by the piano key.

In Fig. 2 the piano action is illustrated in an operated position with the wippen being rotated in a counter-clockwise direction by the abstract 14. The fly jack 15 after causing rotation of the hammer has been engaged by the let-off 20 and is released from the hammer. The cooperation of the various members of the piano action and the interengagement therebetween is generally the same as in standard drop type actions. However, it will be noted that the pivotal connection of the wippen 12 and the rail 10 and the pivotal connection between the fly jack 15 and the wippen 12 is not the standard pin and bushing joint but is a knife edge connection which provides smooth, fast operating, pivotal connection between the members.

The structure of the knife edge pivotal connections are more fully shown in Figs. 3-5 inclusive together with Figs. 1 and 2. The wippen 12 is pivotally mounted on the flange 27, with the actual pivotal connection being provided by the wedge shaped portions 30 of the flange 27 having edges 31 which engage the valley 32 of V-grooves 33 in the wippen 12. A portion 34 of the flange extends through an opening 35 in the wippen and includes a wedge portion 36 having an edge 37 in line with the edges 31 of the wedge portions 30. The wedge portions 30 and 36 are oppositely directed. A tension member or spring 40 positioned between a portion 41 of the wippen and the edge 37 is held in a flexed condition so that it holds the edge 31 firmly against the valley 32. As the edge 37 of the wedge 36 is in line with the edge 31 of the wedge 30 and the pivotal movement takes place about this line, the edge 37 will not move with respect to the spring 40 so that substantially no friction will be produced by the pivotal connection. It is well known that knife edge connections provide a minimum of friction. The resulting reduction in friction will not only cause the action to operate more easily, but will also permit it to operate more rapidly.

A similar pivotal connection is provided between the fly jack 15 and the wippen 12. In this instance the fly jack includes wedges 44 having edges 45 which are positioned in grooves 46 in the wippen. The fly jack includes a portion 47 extending through an opening 48 in the wippen which has a sharp edge 49, in line with the edges 45, and engaging the spring 40. This similarly provides pivotal movement about the edges 45 which is substantially without friction resulting in a very fast and smooth operation.

The spring member 40, as illustrated, may be made of a sufficiently strong and resilient plastic material or may be made of a suitable spring metal. The spring member must hold the edges firmly in the grooves and by so doing automatically compensates for slight inaccuracies and for wear of the engaging parts. The material from which the spring member is made must be able to resist the relatively severe shocks applied thereto in the assembly of the action and handling and operating thereof. It must retain its tension for a relatively long time as piano actions must have very long life.

It is obvious that the members making up the action, that is, the flange 27, the wippen 12 and the fly jack 15 may all be molded of plastic material in various standard ways such as by compression or injection molding methods. Also the spring 40 can be easily fabricated of plastic material or metal. The members can thereafter be very easily assembled with the resilience of the spring compensating for slight tolerances in the dimensions so that the operation of the action does not depend on very critical dimensions. It is readily apparent that such a construction is much less expensive and much easier to assemble than standard pivotal connections formed by pins and bushings. The ease of assembly and the corresponding ease of disassembly is a distinct advantage when it is necessary to repair the action.

In Fig. 6 there is illustrated a modified construction in which individual spring members are provided for each pivotal connection. That is, a spring member 50 is provided for holding the edge 31 of the flange 27 against the V-shaped groove 33 of the wippen 12 and a spring 51 is provided for holding the edge 45 of the fly jack 15 against the groove 46. The springs 50 and 51 are held in position on the wippen 12 by recesses 52 and 53 respectively therein. This provides independent assemblies for providing pivotal connection for the wippen and fly jack. These independent assemblies permit the positioning of the resilient members in the most advantageous positions for applying pressure between the edges and grooves of the members, and also permits independent adjustment of the tension of the spring members in the two pivotal connections. There is no interaction between the movement of the two pivots so that the action of each is always uniform.

A further modification of the structure is illustrated in Fig. 7. It is noted that in the construction shown by Figs. 1-6 inclusive, a spring 28 is provided between the wippen 12 and the fly jack 15 to hold the fly jack 15 against the hammer butt 16. It has been found that by properly positioning the edges of the wedge portions of the fly jack 15, the spring 51 may cause the desired movement of the fly jack 15 against the hammer butt. This is illustrated in Fig. 7 in which the edge 45 is slightly displaced from the edge 49. The spring member 51 therefore bears upon the edge 49 at a position slightly displaced from the edge 45 providing a turning movement about the edge 45 which causes the fly jack 15 to tend to rotate in a counter-clockwise direction to cause the end of the fly jack to engage the hammer butt. A slight displacement of a few thousandths of an inch will provide the necessary biasing action and will not cause sufficient additional friction in the pivotal movement to prevent satisfactory operation of the action. In practice a displacement of the order of 4 thousandths of an inch has been found to be satisfactory.

From the above, it is apparent that the pivotal connection in accordance with the invention provides a simple, inexpensive and highly desirable piano action. The cost of the molded plastic members will be a small fraction of that of typical wood actions having the usual pin and bushing joints. A further saving in cost results from the simplicity of assembly and the non-critical adjustment of the action. The actions constructed in accordance with the invention are very easy to operate and operate very fast, providing what is believed to be the fastest repeating action ever constructed. Maintenance of the action is reduced both because of the ease of assembly and disassembly thereof and because the spring members tend to compensate for wear of the parts so that maintenance is not required.

While certain embodiments of the invention have been described which are illustrative thereof, it is obvious that various changes and modifications can be made therein without departing from the intended scope of the invention as defined in the appended claims.

I claim:

1. In a piano action, a first member, a second member pivotally supported on said first member, said second member including a pair of oppositely disposed wedge portions having edges which are substantially aligned, said first member having a recess for receiving the edge of one of said wedge portions, and a spring member engaging said first member and the edge of the other of said wedge portions for holding said first and second members in assembled relation.

2. In a piano action a wippen, a fly jack pivotally supported on said wippen, said fly jack including a pair of oppositely disposed wedge portions having edges which are substantially aligned, said wippen having a recess for receiving the edge of one of said wedge portions, and a spring member engaging said wippen and the edge of the other of said wedge portions for holding said wippen and said fly jack in assembled relation.

3. In a piano action, first and second members pivotally interconnected, said first member including a portion having a relatively sharp edge, said second member having an opening therein adapted to receive a part of said first member and a groove adapted to receive said sharp edge, and a spring engaging said second member and said part of said first member for holding said sharp edge in said recess.

4. In a piano action, first and second members pivotally interconnected to a third member, said first and second members including wedge portions having relatively sharp edges, said third member having a pair of recesses adapted to receive said sharp edges, and a spring element bearing against said third member and engaging said first and second members for holding said sharp edges in said recesses to permit pivotal movement of said members about said sharp edges.

5. In a piano action, first and second members pivotally interconnected, said first member including a wedge portion having a relatively sharp edge, said second member having a V-shaped groove therein adapted to receive said sharp edge, the angular extent of said groove being greater than that of said wedge portion so that said first member may be pivoted with respect to said second member about said groove, and a torsion member engaging said first and second members for holding said sharp edge of said wedge portion in the valley of said groove.

6. In a piano action, first and second members pivotally interconnected, said first member including a wedge portion having a relatively sharp edge, said second member having a recess adapted to receive said sharp edge, and a spring member engaging said first and second members for holding said sharp edge in said recess to permit pivotal movement about said sharp edge.

7. In a piano action, first and second members pivotally interconnected, said first member including a reduced part with an aperture therein and wedge portions on the sides of said reduced part, said second member having an opening therein adapted to receive said reduced part of said first member and grooves on the sides of said opening for receiving said wedge portions, and a spring member engaging said second member and extending in said aperture in said first member for holding said wedge portions in said groove.

8. In a piano action, a flange secured to a fixed rail, a whippen and a fly jack, said flange and said fly jack being pivotally interconnected with said wippen and each including a reduced part with an aperture therein and wedge portions on the sides of said reduced part, said wippen having a pair of openings therein adapted to receive said reduced parts of said flange and said fly jack and grooves on the sides of said openings for receiving said wedge portions, and a spring member engaging said wippen having ends extending in said apertures in said flange and said fly jack for holding said wedge portions in said grooves.

9. A pivotal connection comprising a first member, a second member pivotally connected to said first member, said second member including a first wedge portion and a reduced extension including a second wedge portion, said wedge portions being oppositely disposed with respect to each other and having edges which are substantially aligned, said first member having an opening for receiving said reduced extension and a recess for receiving the edge of said first wedge portion, and a spring member engaging said first member and the edge of said second wedge portion for holding said first and second members in assembled relation.

10. In a piano action a wippen, a flange and a fly jack pivotally connected to said wippen, said flange and said fly jack each including a first wedge portion and a reduced extension including a second wedge portion with said wedge portions being oppositely disposed with respect to each other and having edges which are substantially aligned, said wippen having openings therein for receiving said reduced extensions and recesses for receiving the edges of said first wedge portion, and a spring member engaging said wippen having ends bearing against said second wedge portion of said flange and said fly jack for holding said flange, wippen and fly jack in assembled relation.

11. In a piano action a first member, a second member pivotally connected to said first member, said second member including a pair of wedge portions forming opposed knife edges with said knife edges being substantially aligned, said first member having a recess adapted to receive one of said knife edges, a spring member engaging said first member and the other of said knife edges for holding said first and second members in assembled relation, and means on said first member for holding said spring in position with respect to said first member.

12. In a piano action a first member, a second member pivotally connected to said first member, said second member including a portion having a relatively sharp edge, said first member having a recess adapted to receive said sharp edge, and a spring member positioned on said first member and engaging said second member for holding said sharp edge in said recess.

13. A piano action including fixed rail structure, a hammer and a wippen pivotally mounted on said rail structure, a fly jack pivotally supported on said wippen and having a portion adapted to engage said hammer, said fly jack including a pair of oppositely disposed wedge portions having sharp edges, said wippen having a recess for receiving the edge of one of said wedge portions, and a spring member engaging said wippen and the edge of the other of said wedge portions for holding said wippen and said fly jack in assembled relation, the edges of said wedge portions being slightly displaced so that said spring tends to hold said fly jack against said hammer.

14. A pivotal connection comprising a first member, a second member pivotally connected to said first member, said second member including a first wedge portion and a reduced extension including a second wedge portion, said wedge portions being oppositely disposed with respect to each other, said first member having an opening for receiving said reduced extension and a recess for receiving the edge of said first wedge portion, and a spring member engaging said first member and the edge of said second wedge portion for holding said first and second members in assembled relation, said edge of said second wedge portion being slightly displaced from said edge of said first wedge portion so that said spring member tends to hold said second member at a particular angle with respect to said first member.

15. A pivotal connection including in combination, a first member, a second member pivotally connected to said first member, said second member including a portion having a relatively sharp edge, said first member having a recess portion adapted to receive said sharp edge and spring means operatively connected to said first and second members and holding said sharp edge in said recess portion under tension.

16. A pivotal connection including in combination, a first member, a second member pivotally connected to said first member, said second member having an aperture therein and having a portion with a relatively sharp edge, said first member having an opening for receiving a portion of said second member and a recess portion for receiving said edge of said second member, and spring means extending in said aperture in said second member and operatively connected to said first member for holding said first and second members in assembled relation with said sharp edge held in said recess portion under tension.

17. In a piano action, the combination including, a flange adapted to be secured to fixed rail means, a wippen, a fly jack, said flange and said fly jack each having an aperture therein and each having a portion with a relatively sharp edge, said wippen having first and second openings therein for receiving portions of said flange and said fly jack respectively and having recess portions adjacent said openings for receiving said sharp edges of said flange and said fly jack, and spring means having portions extending in said apertures in said flange and said fly jack and a portion operatively connected to said wippen for holding said sharp edges in said recess portions under tension.

LOUIS MESSANT.

REFERENCES CITED

The following references are of record in the file of this patent:

UNITED STATES PATENTS

| Number | Name | Date |
|---|---|---|
| 776,841 | Hornbeck | Dec. 6, 1904 |
| 1,650,095 | Rydberg | Nov. 22, 1927 |

FOREIGN PATENTS

| Number | Country | Date |
|---|---|---|
| 352,282 | France | May 26, 1905 |